US009697836B1

(12) United States Patent
Lousky et al.

(10) Patent No.: US 9,697,836 B1
(45) Date of Patent: *Jul. 4, 2017

(54) AUTHENTICATION OF USERS OF SELF SERVICE CHANNELS (71) Applicant: NICE Ltd, Ra'anana (IL)

(72) Inventors: Avraham Lousky, Hod Hasharon (IL); Amnon Buzaglo, Karkur (IL); Oren Yaakov Lewkowicz, Shoham (IL); Oren Weiss, Kfar Saba (IL)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,523

(22) Filed: Dec. 30, 2015

(51) Int. Cl.
G10L 21/00 (2013.01)
G10L 15/00 (2013.01)
G10L 25/00 (2013.01)
G10L 17/04 (2013.01)
G10L 17/22 (2013.01)
G10L 17/14 (2013.01)
H04L 29/06 (2006.01)

(52) U.S. Cl.
CPC .............. *G10L 17/04* (2013.01); *G10L 17/14* (2013.01); *G10L 17/22* (2013.01); *H04L 63/0861* (2013.01)

(58) Field of Classification Search
USPC ................. 704/236, 246, 247, 270, 275, 277
See application file for complete search history.

(56) References Cited

U.S. PATENT DOCUMENTS

| 8,056,128 | B1 | 11/2011 | Dingle et al. |
| 8,145,562 | B2 | 3/2012 | Wasserblat et al. |
| 8,225,413 | B1 | 7/2012 | De et al. |
| 8,751,233 | B2* | 6/2014 | Bansal .................. G10L 17/24 |
| | | | 379/88.01 |
| 9,032,217 | B1 | 5/2015 | Brandwine |

(Continued)

OTHER PUBLICATIONS

Doddington et al. "Sheep, Goats, Lambs and Wolves. A Statistical Analysis of Speaker Performance in the NIST 1998 Speaker Recognition Evaluation", National Institute of Standards and Technology, The Johns Hopkins University U.S. Department of Defense, MIT Lincoln Laboratory, SRI International, pp. 1-4.

(Continued)

*Primary Examiner* — Edgar Guerra-Erazo
(74) *Attorney, Agent, or Firm* — Pearl Cohen Zedek Latzer Baratz LLP (57) ABSTRACT An interactive voice response (IVR) system comprises a memory storing recorded segments of speech by individuals, and a processor configured to enroll individuals. The enrollment process may comprise retrieving one or more of said recorded segments of speech by an individual from said memory and using the retrieved segments to create a voice print for the individual. The suitability of the voice print for authenticating the individual in an IVR system is then tested. This may be done using segments of speech of a predetermined maximum duration such as three seconds or some other amount commensurate with the typical duration of a voice response in an IVR system. An individual may be enrolled as suitable for IVR authentication if the voice print passed the suitability test. Individuals may be authenticated using a voice print only if the voice print has passed the suitability test.

20 Claims, 7 Drawing Sheets

(56) References Cited

U.S. PATENT DOCUMENTS

| | | | |
|---|---|---|---|
| 9,042,867 B2* | 5/2015 | Gomar | H04W 12/06 455/411 |
| 2005/0097320 A1 | 5/2005 | Golan et al. | |
| 2006/0090073 A1 | 4/2006 | Steinberg et al. | |
| 2006/0106605 A1 | 5/2006 | Saunders et al. | |
| 2006/0271457 A1 | 11/2006 | Romain et al. | |
| 2006/0277043 A1 | 12/2006 | Tomes et al. | |
| 2007/0177768 A1 | 8/2007 | Tsantes et al. | |
| 2008/0300877 A1 | 12/2008 | Gilbert et al. | |
| 2008/0312926 A1* | 12/2008 | Vair | G10L 17/16 704/249 |
| 2009/0055193 A1 | 2/2009 | Maislos et al. | |
| 2009/0319270 A1 | 12/2009 | Gross | |
| 2010/0153110 A1* | 6/2010 | Chang | G10L 15/10 704/248 |
| 2010/0228656 A1 | 9/2010 | Wasserblat et al. | |
| 2011/0010543 A1 | 1/2011 | Schmidt et al. | |
| 2011/0161076 A1 | 6/2011 | Davis et al. | |
| 2012/0284026 A1 | 11/2012 | Cardillo et al. | |
| 2013/0225128 A1* | 8/2013 | Gomar | H04W 12/06 455/411 |
| 2013/0232073 A1 | 9/2013 | Sheets et al. | |
| 2014/0136194 A1 | 5/2014 | Warford et al. | |
| 2014/0279486 A1 | 9/2014 | Kessler | |
| 2014/0330563 A1 | 11/2014 | Faians et al. | |
| 2014/0348308 A1 | 11/2014 | Krause | |
| 2015/0095019 A1 | 4/2015 | de Zeeuw et al. | |
| 2015/0112680 A1 | 4/2015 | Lu | |
| 2015/0229765 A1 | 8/2015 | Hirata | |
| 2015/0326571 A1* | 11/2015 | Gomar | H04W 12/06 726/6 |
| 2016/0275952 A1 | 9/2016 | Kashtan | |
| 2016/0365095 A1 | 12/2016 | Lousky et al. | |

OTHER PUBLICATIONS

"The Security Value of Voice Biometrics for IVRs and Call Centers" Nuance, Feb. 2013, Retrieved from http://www.nuance.com/ucmprod/groups/enterprise/@web-enus/documents/collateral/nc_028568.pdf on Sep. 18, 2014.

"Nuance Voice Biometrics: Improving the Caller Experience" Nuance, 2012, Retrieved from http://china.nuance.com/ucmprod/groups/enterprise/@web-enus/documents/collateral/nc_019968.pdf on Sep. 18, 2014.

* cited by examiner

AUTHENTICATION OF USERS OF SELF SERVICE CHANNELS

FIELD OF THE INVENTION

This invention relates generally to the field of authentication of individuals. In particular, the invention relates to the authentication of individuals using their voices.

BACKGROUND OF THE INVENTION

Large organizations, such as commercial organizations, financial institutions, government agencies or public safety organizations conduct communication sessions, also known as interactions, with individuals such as customers, suppliers and the like on a daily basis.

Communication sessions between parties may involve exchanging sensitive information, for example any of financial data, transactions and personal medical data. Thus in communication sessions with individuals it may be necessary to authenticate the individual, e.g., ensure that the individual really is who he or she claims to be. Authentication may include checking that identification details provided by an individual match identification details held on record for that individual. Authentication may be required for example before offering an individual any information or services. When a communication session begins a system or agent on behalf of one party may first identify the individual. Some organizations use voice prints to authenticate the identity of individuals.

The term "voice print" as used herein is intended to encompass voice biometric data. Voice prints are also known by various other names including but not limited to spectrograms, spectral waterfalls, sonograms, and voicegrams. Voice prints may take many forms and may indicate both physical and behavioral characteristics of an individual. One type of voice print is in the form of time-varying spectral representations of sounds or voices. Voice prints may be in digital form and may be created from any digital audio recordings of voices, for example but not limited to audio recordings of communication sessions between call center agents and customers. A voice print can be generated in many ways known to those skilled in the art including but not limited to applying short-time Fourier transform (STFT) on various (preferably overlapping) audio streams of a particular voice such as an audio recording. For example each stream may be a segment or fraction of a complete communication session or corresponding recording. A three-dimensional image of the voice print may present measurements of magnitude versus frequency for a specific moment in time.

Some speaker's voices may be extremely difficult to forge for biometric comparison purposes, since a myriad of qualities may be measured ranging from dialect and speaking style to pitch, spectral magnitudes, and format frequencies. For some individuals, the vibration of an individual's vocal chords and the patterns created by the physical components resulting in human speech are as distinctive as fingerprints.

It should be noted that known methods for the generation of voice prints do not depend on what words are spoken by the individual for whom the voice print is being created. They simply require a sample of speech of an individual from which to generate the voice print. As such those methods may be said to be "text-independent". The larger the sample, the more information may be included in the voice print and the more reliable the voice print will be in authenticating an individual.

Voice prints have been used to authenticate individuals in some kinds of communication session between individuals and service providers. Many known techniques for such authentication require some kind of activity on the part of the individual such as visiting a website or calling a call center to facilitate the creation of the voice print. This requirement has hindered the take-up of voice print technology for user authentication.

Some kinds of communication session use so-called "self-service" channels in which an individual interacts with a machine to conduct a transaction. Some examples of such self-service channels use an interactive voice response "IVR" system in which a user speaks and the system responds with speech. Others simply prompt a user to utter some speech, for example using an instruction in text form. Using a self-service channel, a complete transaction may be concluded between an individual and another party with no human intervention on the part of the other party. Accurate authentication can be particularly important in such situations. Hitherto it has been considered that the use of voice prints, and particularly text-independent voice prints, is typically not suitable for authenticating users of self-service channels because, for example, only short bursts of speech e.g. in the range of 3-5 seconds may be obtained from the user, and experience has shown that the use of such short bursts of speech typically does not lead to adequate performance.

SUMMARY

Some embodiments of the invention provide systems and methods for the passive authentication of individuals by means of text-independent voice biometrics to use self-service channels. According to some embodiments of the invention, in order to achieve high accuracy of authentication, background suitability tests or filtering are automatically performed on the voice prints of individuals and only those for whom highly accurate authentication is possible are enrolled for authentication by voice biometrics. The suitability testing may be tailored to self-service channels and therefore use speech segments of the kind, e.g. duration, which may be available in a self-service channel.

According to some embodiments of the invention, the level of accuracy may be predetermined and the proportion of individuals enrolled, or not enrolled, may be determined based on this predetermined level of accuracy. Those individuals not enrolled are filtered out and for them other authentication methods may be used to permit them to use self-service channels. For example, it may be decided that the false rejection rate, FAR, should be no more than e.g. 1%. This FAR may be used as part of the suitability test which may result in a proportion of a population of individuals not being enrolled for authentication by voice biometrics. The proportion of individuals not enrolled may be determined using threshold FRR and FAR, which may be related to each other.

Some embodiments of the invention use speech segments of a predetermined maximum duration in testing a voice print for suitability. The larger the duration, the higher the accuracy will be. Therefore according to some embodiments of the invention the maximum duration may be chosen according to the desired degree of accuracy. According to some embodiments of the invention the maximum duration may be chosen to be commensurate with the length of a typical utterance in a self-service channel. The shorter the duration, the more individuals will be rejected as not having a suitable voice print for text-independent authentication in a self-service channel. Thus some embodiments of the invention include determining one or both of
- a proportion of candidate individuals for enrolment to be accepted, and
- a level of authentication accuracy, and determining the maximum duration based on one or both of the acceptance proportion and the authentication accuracy. The authentication accuracy may be determined based on one or both of false acceptance rate and false rejection rate as is known to those skilled in the art.

Some embodiments of the invention include determining a proportion of candidate individuals to be excluded from enrolment based on a predetermined a level of authentication accuracy. The proportion of candidates excluded may be controlled through the use of decision thresholds in the suitability testing.

Some embodiments of the invention provide a self-service system. The system may comprise at least first and second memories, the first storing details of individuals enrolled to use the system and the second storing previously recorded segments of speech by those individuals. The system may be configured to enroll individuals and to authenticate previously enrolled individuals. One or more processors may be suitably programmed for this purpose.

The enrollment may comprise retrieving one or more of said previously recorded segments of speech from said second memory and using the retrieved segments to create a voice print for the individual. The suitability of the voice print for authenticating the individual may then be tested using segments of speech of a predetermined maximum duration which are different from the previously recorded segments used to create the voice prints. The individual may be enrolled as suitable for voice biometrics authentication if the voice print passed the suitability test. The enrollment may be recorded in the first memory. The predetermined maximum duration may be chosen to be commensurate with the typical duration of voice responses by individuals using an IVR system or other self-service channel for which the authentication is intended.

When an individual who has been enrolled in this way revisits the system, he or she may be authenticated using the voice print.

Some embodiments of the invention make use of the fact that some members of a population do have voices that are capable of authentication using only a short burst of speech. Using the suitability test, those whose voices can be authenticated can benefit from authentication by voice print.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", "checking", "receiving", "selecting", "sending a request", "comparing", "enrolling", "reporting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The following are further definitions of terms used in this description and in the field to which the invention relates:

The terms "communication session" and "interaction" are used herein interchangeably and are intended to have the same meaning. The term "voice interaction" denotes an interaction or communication that includes a voice element, however small, by at least one party.

The term "self-service channel" is used to refer to a communication channel in which a complete transaction may be concluded between an individual and another party with no human intervention on the part of the other party. An IVR system is one illustrative example of a system using a self-service channel. A self-service channel may not use an IVR system.

The term "individual" is used to refer to a human for example one for whom a voice print may be created. In the specific embodiments described herein a customer for a service is used as an example of an individual. All embodiments unless otherwise stated are applicable to individuals other than customers.

The term "segment" is used to refer to a portion, e.g. of speech, which may be the whole or part. Thus for example a segment of speech may be the whole of a speech made by an individual or an extract from that speech.

IVR systems are sometimes referred to as automated voice response "AVR" systems and unless otherwise stated the term "IVR system" is used herein to encompass AVR systems. Such systems do not necessarily operate only on audio channels and may use keypad input for example. An IVR system may be configured to interact with an individual by responding to words or phrases uttered by the user with one or more pre-recorded or automatically generated audible words or phrases.

The term "voice recognition" is generally but not always consistently used in the art to refer to the recognition of words in speech.

The term "voice biometrics" is used herein to refer to techniques for distinguishing the voice of one individual from that of another, generally performed by machinery for example using signal processing.

Systems and methods according to some embodiments of the invention relate to the enrollment of individuals using voice prints, for example to enable them to use particular services.

According to some embodiments of the invention, creation or generation of a voice print can be based on any past communication sessions with an individual that include some speech by the individual. No positive action by the individual needs to be required for the generation of the voice print and subsequent enrollment. Similarly no positive action on the part of the individual needs to be required for the authentication of the individual. According to some embodiments of the invention the consent of the individual to enrollment and/or authentication in this way may be required to satisfy regulatory requirements in some jurisdictions.

It is possible according to some embodiments of the invention for a voice print to be created using information from one recording of speech by the individual, e.g. one audio file, for example from one past or historic call. This voice print may be enriched with information from one or more other historic calls, with information from calls made after the creation of a voice print, following authentication, or both.

Some embodiments of the invention may use text-independent biometric techniques to authenticate customers without requiring previous active enrollment.

A significant percentage of the human population can be authenticated using only a short, e.g. three to five seconds, segment of audio. These individuals may be enrolled using voice prints and receive the associated benefits, which may include faster authentication, whilst the remainder may be authenticated in another manner known in the art.

The verification or authentication of customers for services using their voices is becoming popular, especially in self-service channels such as IVR and/or mobile channels. Hitherto this has been done by asking customers to repeat the same phrase a few times. This phrase can be referred as their voice password. This technology is called "text dependent" voice authentication since the customer is asked to say a specific phrase. This is as opposed to text independent voice authentication where the customer is verified by speaking freely and is not required to say something specific.

The problem with the use of voice passwords is that it requires the customers first to enroll their voice print. The enrollment is done actively by asking the customer to call a specific number and run an active enrollment process. Usually the customer needs to do so several times. The result of the enrollment process is a creation of a customer voice print. When the customer calls his voice is compared to this voice print. The enrollment may be tedious and cumbersome for customers and may deter them from choosing this method of authentication.

Embodiments of the invention may provide a way of bypassing this active enrollment process and may instead provide a way of enrolling customers passively, without asking them to do anything. This passive enrollment may be achieved using historical recordings of speech by the customer. Systems according to some embodiments of the invention may create text independent voice prints of specific customers from historic calls.

IVR calls and other interactions through self-service channels usually yield very short audio samples of the customers, which are typically only a few seconds long. When authenticated by text independent voice prints such samples typically have a pass rate of about 70%. This pass rate can be impacted by the quality of the voice print and the characteristics of the speaker's voice. Such a low pass rate is typically not considered acceptable for commercial applications.

This problem can be mitigated according to some embodiments of the invention by running voice prints through a test to determine whether they qualify to authenticate individuals for authentication in self-service channels. If a voice print qualifies, the next time the customer calls the self-service system he can be authenticated without having taken any positive enrollment steps. Some embodiments of the invention can enable the automatic detection of those voice prints which are most likely to allow text independent authentication using only short audio samples.

Figure 1:
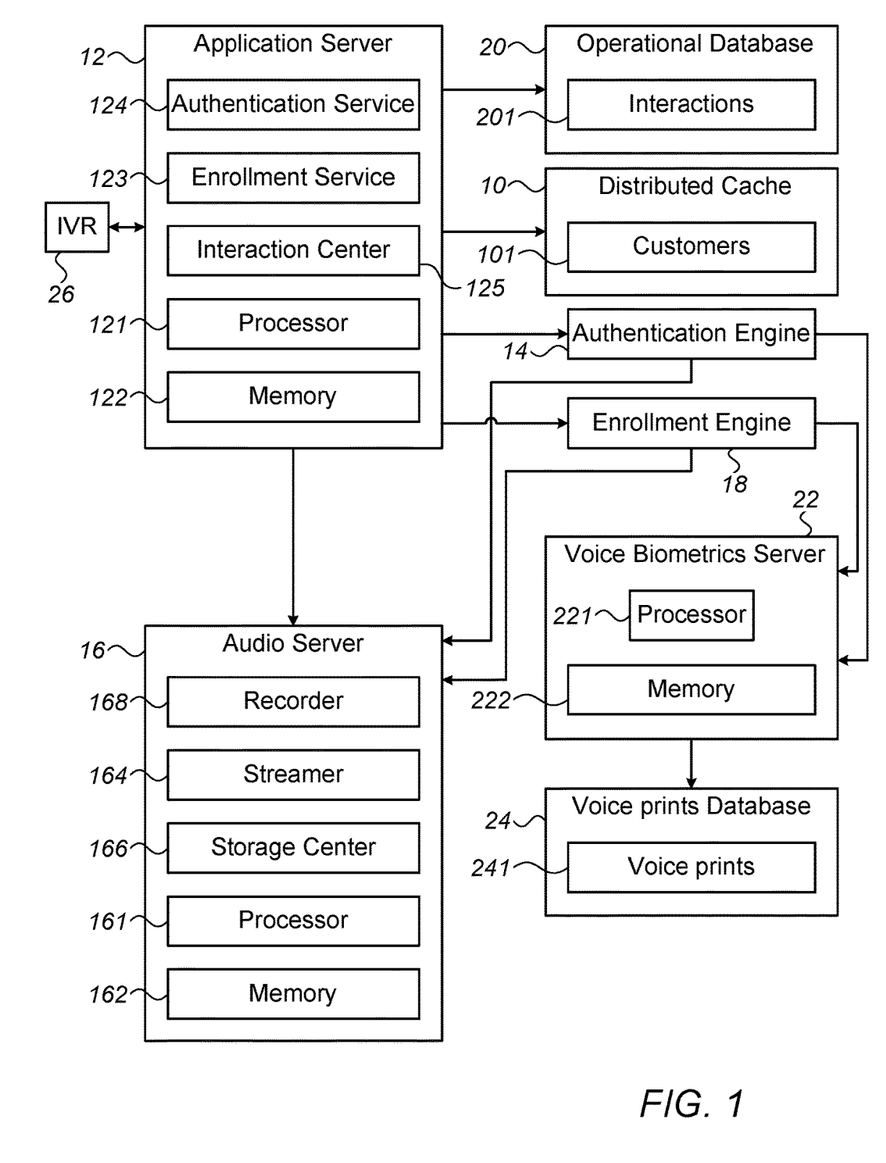
FIG. 1 is a high level block diagram of an example self-service system in the form of an IVR system according to some embodiments of the present invention.

Reference is now made to FIG. 1 which is a high-level block diagram of an IVR system capable of performing any of generating voice prints, authenticating individuals, enrolling individuals and otherwise interacting with individuals in accordance with some embodiments of the present invention. At least some of the components of the system illustrated in FIG. 1 may for example be implemented in a call center environment. As used herein "call center", otherwise known as a "contact center" may include any platform that enables two or more parties to conduct a communication session. A call center may include system components in addition to those illustrated in FIG. 1. For example, a call center may include multiple IVR units as well as one or more user devices not described herein that may be operated by human agents, either of which may be used to conduct a communication session with an individual.

The system may include one or more audio servers 16 (only one is shown) to record communication sessions, an application server 12 configured to control the enrollment and/or authentication processes, an operational database 20 that includes data related to individuals and communication sessions, a voice biometrics server 22 configured to generate voice prints of the individuals, and an IVR unit 26.

It should be noted that the various servers shown in FIG. 1 may be implemented on a single computing device according to some embodiments of the invention. Equally, the functions of any of the servers may be distributed across multiple computing devices. In particular, the voice biometrics functions need not be performed on a server. For example they may be performed in suitably programmed processors or processing modules within any computing device. Each of the servers 12, 16, 22, includes at least one respective processor 121, 161, 221, configured to perform one or more operations, for example under the control of one or more programs stored in respective memories 122, 162, 222.

Application server 12 may receive information from any of IVR unit 26, from operational data base 20 and from voice biometric server 22. Voice biometric server 22 may generate voice prints from audio streams received from audio server 16. Any of audio server 16, IVR unit 26 and user devices may be included in a call center or contact center for conducting and recording communication sessions.

During a communication session, application server 12 may receive from IVR unit 26 a request to authenticate an individual. After performing the authentication and while the communication session still proceeds, management server 12 may send a notification to the user device or the IVR unit 26, confirming whether the individual was successfully authenticated or not. Further, according to some embodiments of the invention, application server 12 may perform passive or seamless authentication of individuals and control enrollment of voice prints. Thus the enrollment process may take place without the knowledge of the customer and according to some embodiments without any need to change the manner in which an IVR system or unit interacts with the customer.

Application server 12 may be configured to implement various applications including an enrollment service 123 and an authentication service 124, and thus the application server 12 may function as an enrollment server 122 and an application server respectively.

For the purpose of enrollment, application server 12 may be configured to control the enrollment of individuals using voice prints according to enrollment logic. Application server 12 may communicate with, or in some embodiments include, an enrollment engine 123. Enrollment engine 123 which may comprise a module responsible for managing (e.g. collecting and dispatching) enrollment requests and "feeding" the enrollment service 123.

For the purpose of authentication, the application server 12 may be configured to control automatic and seamless authentication of an individual during a communication session. Application server 12 may communicate with, or in some embodiments include, authentication engine 14. This may comprise a voice biometrics engine which operates in conjunction with voice biometrics server 22 to run voice-print matching to audio segments. For example authentication engine 14 may fetch audio information from the audio server 16 and then send it to the voice biometrics server 22 for authentication.

Processors 121, 161, 221 may be any computer, processor or controller configured to execute commands included in a software program, for example to execute the methods disclosed herein. Processor2 121, 161, 221 may include components such as, but not limited to, one or more central processing units (CPU) or any other suitable multi-purpose or specific processors or controllers, one or more input units, one or more output units, one or more memory units, and one or more storage units. Processors 121, 161, 221 may additionally include other suitable hardware components and/or software components.

Memories 122, 162, 222 may store codes to be executed by respective processors 121, 161, 221. Memories 122, 162, 222 may be in communication with or may be included in respective processors 121, 161, 221. Each memory 122, 162, 222 may include a mass storage device, for example an optical storage device such as a CD, a DVD, or a laser disk; a magnetic storage device such as a tape, a hard disk, Storage Area Network (SAN), a Network Attached Storage (NAS), or others.

According to some embodiments of the invention, application server 12 may communicate with a distributed cache 10, which in some embodiments may be part of memory 122. The distributed cache 127 may comprise an in-memory database including data relating to customers 101, for example customers enrolled to use the system, used for fast data fetching in response to queries, e.g. IVR unit 26.

According to some embodiments of the invention, application server 12 may additionally include an interaction center 125. The functions of the interaction center 125 include managing the recording of interactions. For example the interactions center may be a module that, for example during a telephone call from a user, interacts with switching equipment, not shown, to obtain start and/or end of call events, metadata and audio streaming. The interaction center 125 may extract events from a call sequence and translate or convert them for storage, indexing and possibly other operations in a backend system such as operational database 20.

According to some embodiments of the invention, the IVR unit 26 may be configured to "listen" to events and extract information relating to communication sessions. Examples of such events may include but are not limited to:
  the start of a communication session with an individual
  the resolving of an individual, e.g. the retrieval of information from the operational database 20 purporting to identify the individual During a communication session IVR unit 26 may receive identification information from an individual, for example, the name of the individual, a customer number associated with the individual, an ID number and/or a social security number. Additionally or alternatively, IVR unit 26 may receive identification information related to the individual automatically from details related to the "call", for example, the telephone number from which the individual calls, or the area (PIN code) from which the individual calls. An IVR unit may retrieve information related to the identity of the individual from database 20 via application server 12. The individual may be asked so called know your customer "KYC" questions related to data stored in database 20. For example, the individual may be asked to provide personal details (e.g., credit card number, and/or the name of his pet) or to describe the latest actions performed (e.g., financial transactions). During the communication session, an audio segment or an audio stream may be recorded and stored in audio server 16.

Audio server 16 may include an audio recorder 162 to record the individual's voice, an audio streamer 164 to stream the recorded voice, and a storage center 166 to store voice recording, for example recorded segments of speech by individuals made in previous calls. Processor 161 may be configured to control the recording, streaming and storing of the audio stream and memory 162 may store code to be executed by the processor 161. Audio recorder 162 may include any components configured to record an audio segment during a communication session. Processor 161 may instruct audio streamer 164 to receive audio segment from recorder 162 and stream the segment into audio streams or buffers. Audio server 16 may further include, or may be in communication with, any storage unit(s) for storing the audio stream, e.g., in an audio archives. The audio archives may include audio data (e.g., audio streams) of historical communication sessions.

Storage center 164 may store historical and ongoing speech and calls of individuals, for example but not limited to calls between individuals and IVR unit 26.

Operational database 20 may include one or more databases, for example, at least one of an interaction database 201 and a transaction database, not shown. The operational database 20 may include the voice print database 24. Interaction database 202 may store non-transactional information of individuals such as home address, name, and work history related to individuals such as customers of a company on whose behalf a call center is operating. Voice print database 24 may store voice prints 241. Furthermore, operational database 20 may store interaction information related to previous communication sessions conducted with the individual, such as but not limited to the time and date of the session, the duration of the session, information acquired from the individual during the session (e.g., authentication information, successful/unsuccessful authentication). Applications used in a system according to some embodiments of the invention may also be stored in operational database 20.

Audio or voice recordings recorded, streamed and stored in audio server 16 may be processed by voice biometric server 22. Voice biometric server 22 may include one or more processors 221 and one or more memories 222. Processor 221 may include or may control any voice biometric engine known in the art, for example, the voice biometric engine by Nuance Inc. to generate a voice print (e.g. voice biometric data) of at least one audio stream received from audio server 16. The voice print may include one or more parameters associated with the voice of the individual. Processor 221 may include or may control any platform known in the art, for example the platform by Nuance Inc. USA, for processing (e.g., identifying and comparing) voice prints generated from two or more audio streams. When an audio stream associated with an individual is a candidate for enrollment, voice biometric server 22 may receive from application server 12 a recorded call consisting of a verified individual identity. Following the verification, voice biometric server 22 may generate a voice print of the audio stream related to the individual. Processor 221 may further be configured to compare the generated voice print to other voice prints previously enrolled and stored, for example, in one or more storage units associated with voice biometric server 22. Storage units associated with voice biometric server 22 may include voice prints stored at a potential fraudster list (i.e., watch list, black list, etc.), voice prints related to the individual that were enrolled following previous communication sessions with the individual, and/or voice prints related or associated with other individuals. Memory 222 may include codes or instructions to be executed by processor 221.

Methods and systems for enrolling and authenticating individuals according some embodiments of the invention will now be described in more detail with reference to FIGS. 2 to 5.

The enrollment of an individual using a voice print may be done actively by asking an individual, e.g. customer, to make a call to a specific number and undergo an active enrollment process, which may for example involve the customer saying a chosen phrase. The customer may be asked to do this several times, which some individuals find onerous or intrusive and do not continue with the enrollment. The result of the enrollment process is the creation of a voice print for the individual. After enrollment, when an individual makes a call his voice is compared to this voice print, for example by the individual saying the chosen phrase.

Some embodiments of the invention may bypass this enrollment process and instead provide a way to enroll individuals passively, without asking them to do anything. This may be done using historical recordings of the individual's voice. Systems according to some embodiments of the invention may review all, or a selection of, recordings of previous calls of a specific individual. The next time a communication session is initiated with the individual, for example the when the individual makes a call, the individual can be authenticated without having positively enrolled previously. According to some embodiments even the authentication can be done without the individual being aware that it is being done. The enrollment may be a backend process that takes place using historic calls and need not be carried out in response to a customer call.

Retrieving recordings associated with a specific individual may be a fully automated process which means that some or all of the recordings of a given individual may be retrieved without any manual assistance.

Figure 2:
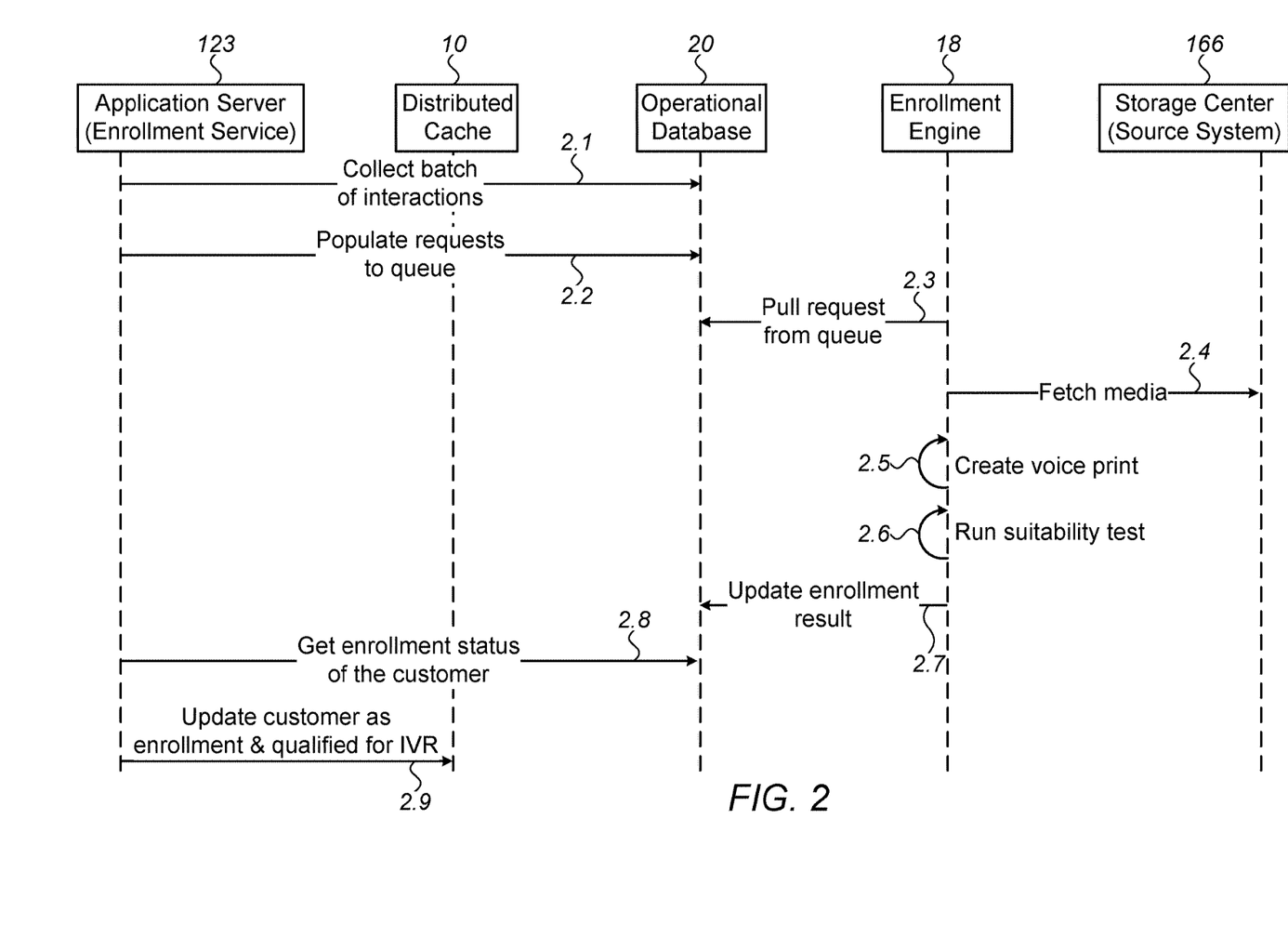
FIG. 2 is a sequence diagram for the enrollment of individuals according to embodiments of the invention.

A sequence diagram showing a possible message and information flow in a system according to some embodiments of the invention will now be described with reference to FIG. 2. Each arrow in FIG. 2 represents an event or message sequence exchanged between components of the system shown in FIG. 1, as follows:

2.1: A request 2.1 is sent from applications server 12, particularly enrollment service 12, to operational database 20 to collect a batch of interactions according to one or more filters. These are filters that may be set by an application such as the enrollment service 123 such as call duration, agent name, level of authentication e.g. indicating permissions granted to an individual, or any other business based filter to bring enrollment candidate interactions. The batch of interactions is fed to the enrollment service 123.

2.2: The applications server 12 populates requests for enrollment to a queue which may be held at the operational database 20.

2.3: Requests from the queue held at the operational database 20 are output from the queue for processing by the enrollment engine 123.

2.4: Retrieval of relevant media for processing, in this case one or more previously recorded segments of speech from of interactions by a particular individual, to be played from the storage center 166 at the audio server 16.

2.5: The creation of a voice print for the individual by the enrollment engine 18 using media fetched from the audio server 16. This is done according to some embodiments of the invention by the enrollment engine calling on the services of the voice biometrics server 221.

2.6: A suitability test is performed on the voice print. This test may be conducted according to some embodiments of the invention in a series of operations described with reference to FIG. 3.

2.7: The enrollment result is fed back from the enrollment engine to the operational database 20. This can indicate whether the individual e.g. customer for whom the voice print was created is eligible for IVR authentication by voice biometrics, for example whether or not the individual is disqualified from authentication by voice biometrics.

2.8: The applications server 26 queries the operational database for the enrollment status of an individual. This may indicate whether the individual is enrolled at all and whether the individual qualifies for enrollment by voice biometrics.

2.9: After discovering the enrollment status, the applications server may notify the distributed cache 10 of the enrollment status of the individual for fast access to this information. This may involve tagging or otherwise recording the individual as enrolled if the voice print passes the suitability test, or tagging or recording the individual as disqualified from authentication by voice biometrics if the voice print fails the suitability test.

A method of enrolling an individual according to some embodiments of the invention will now be described in more detail with reference to FIG. 3. The operations shown in FIG. 3 may be performed by different ones of the components of the system shown in FIG. 2 or, according to some embodiments of the invention they may all be performed by an enrollment server, for example operating at applications server 12.

Figure 3:
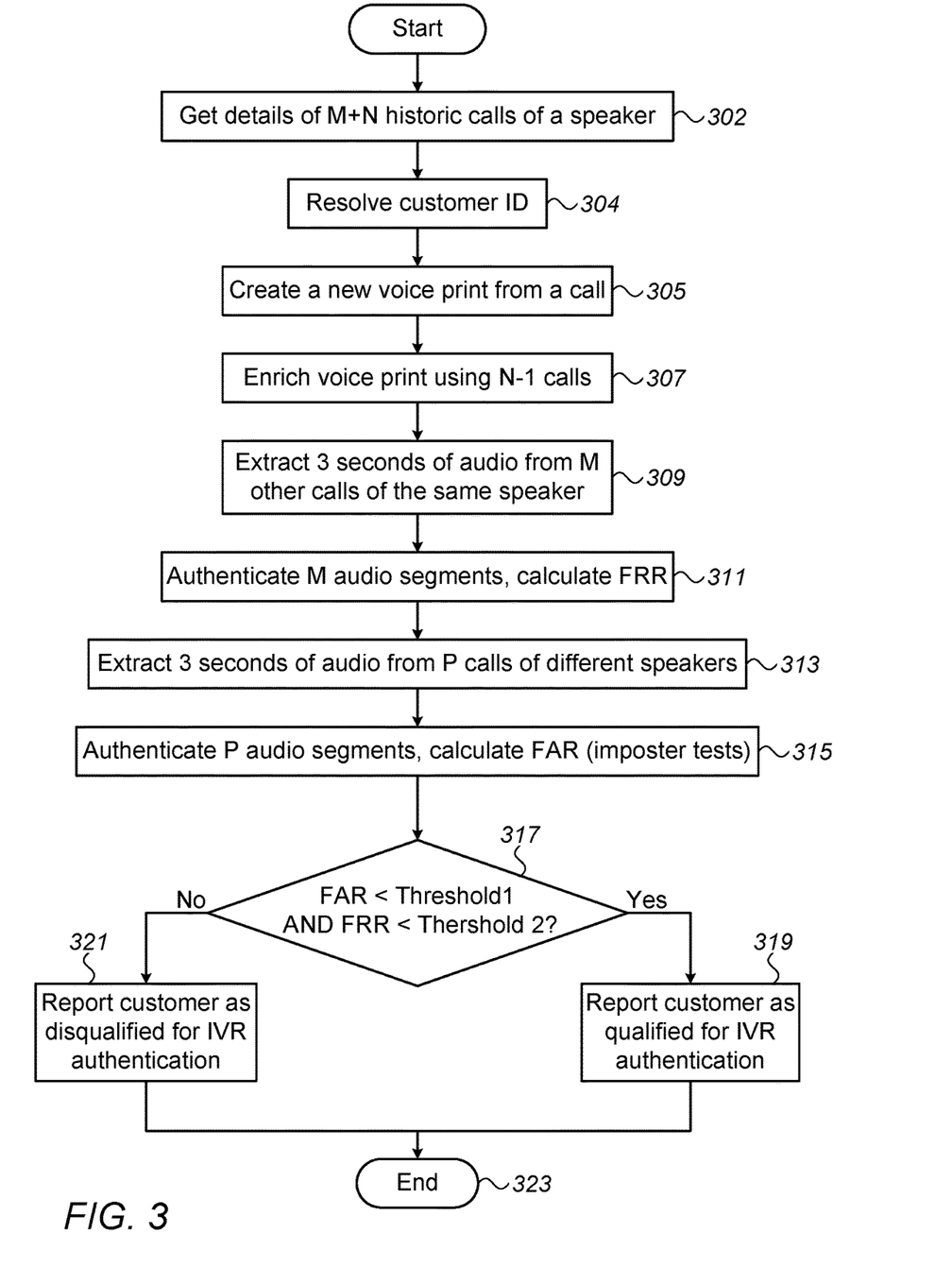
FIG. 3 is a sequence diagram for the enrollment of an individual according to embodiments of the invention.

Referring now to FIG. 3, after start up at operation 300, at operation 302 details of historic calls of an individual, or speaker, are retrieved from the memory in which they are stored, in the example of FIG. 2 this is the storage center 166 at the audio server 16. The details will include a segment of recorded audio for each call and other information identifying the individual, or caller. There may be one segment, or audio file, for each call or there may be multiple segments, depending on how the call was recorded. Ideally a set of M+N calls is retrieved at operation 302 containing details of multiple calls or at least multiple audio segments. The set may then be divided into subsets of calls or segments, each containing multiple calls or audio segments, one containing N calls or segments for use in creating and optionally also enriching a voice print, and the other containing M calls or segments for use in suitability testing the voice print.

At operation 304 the identity of the individual or speaker is resolved from the retrieved information. At operation 305 a voice print for the individual is created. This may be done using audio information from a single call or from multiple calls. In an optional additional operation 307, the voice print may be enriched, in a manner known in the art, using the remaining ones of the N calls or segments, e.g. N −1 calls.

In operations 309-307 the suitability of the individual for IVR authentication, or the suitability of the voice print, may be tested. According to some embodiments of the invention, this testing is done using recordings of speech by the same individual as well as recordings of speech by other individuals. A similar series of operations may be carried out to determine the suitability of a candidate for authentication by voice biometrics in other kinds of self-service channel.

At operation 309 segments of speech of a predetermined maximum duration are extracted from the from the M calls or segments, for example segments that are different from those used in operations 305 and 307 to create or enrich the voice print. The maximum duration is chosen to be commensurate with the duration of verbal responses by customers using IVR systems, for example it may approximate the typical minimum duration of a response. A suitable duration is in the range 3-5 seconds and thus the maximum duration may be 5 seconds. In other embodiments of the invention the maximum duration may be longer. References are made to 3 second segments by way of example only in the description of operations in FIG. 3. The maximum duration may be shorter than the duration of speech segments used to create a voice print. In principle it is not necessary for the extracts used in operation 309 to be taken from other calls. Short extracts of speech from the same call used to create a voice print may be used as part of the suitability testing.

At operation 311 the suitability of the voice print to correctly authenticate the individual is tested by using the 3 second segments extracted in operation 309. This authentication may be done in any manner know in the art of voice biometrics and may for example comprise calculating similarity scores between voices based on the voice print and the 3 second segment. An individual may be authenticated if the similarity score is above a predetermined threshold. Authentication attempts may be made on each of M 3 second segments of audio. Based on the authentication attempts a false rejection rate or FRR is determined.

At operation 313 segments of speech, for example of the same or substantially the same predetermined maximum duration as used in operation 309, are extracted from call recordings of other speakers. These may be randomly selected from the audio server storage center 166, or they may be a predetermined set of speakers whose voices have particular characteristics whereby they may easily, knowingly or unknowingly, imitate other individuals, or a combination of these speakers may be used. In the example a number, P, of speakers who are not the individual to whom the voice print belongs, are used to extract the 3 second segments.

At operation 315 the suitability of the voice print to correctly reject the other speakers, known in the art as "imposters" (deliberate fraudsters or others) is tested. Again this may be done in various ways such as the determination of a similarity score. From this a false acceptance rate FAR is determined. The use of so called "imposter tests" is known in the art of voice biometrics.

It will be appreciated that reliability of the FRR and FAR as a measure of the suitability of the voice print will increase with the values of M and P. In some embodiments the sum of M+P is at least 100. For other groups of individuals, for example if they do not represent a typical population, it may be possible to achieve acceptable results with lower values of M and/or P.

At operation 317 a decision is made as to whether the voiceprint and hence the individual qualifies for IVR authentication, for example authentication in an IVR system by voice biometrics. The results of operations 311 and 315 may be used in various ways to make the decision. In this example, only if the false acceptance rate is below a first threshold and the false rejection rate is below a second threshold is the individual, e.g. customer, reported or tagged as qualified for IVR authentication by voice biometrics at operation 319. For example the first threshold may be chosen to be 1% and the second threshold may be chosen to be 15%. The choice of these thresholds is discussed in more detail with reference to FIGS. 6 and 7.

If either the FRR or the FAR exceeds the threshold, the individual is registered as disqualified from IVR authentication by voice biometrics at operation 321. Operations 319 and 321 correspond to the messaging sequence 2.7 in FIG. 2.

The enrollment process is now complete and ends at operation 323.

Figure 4:
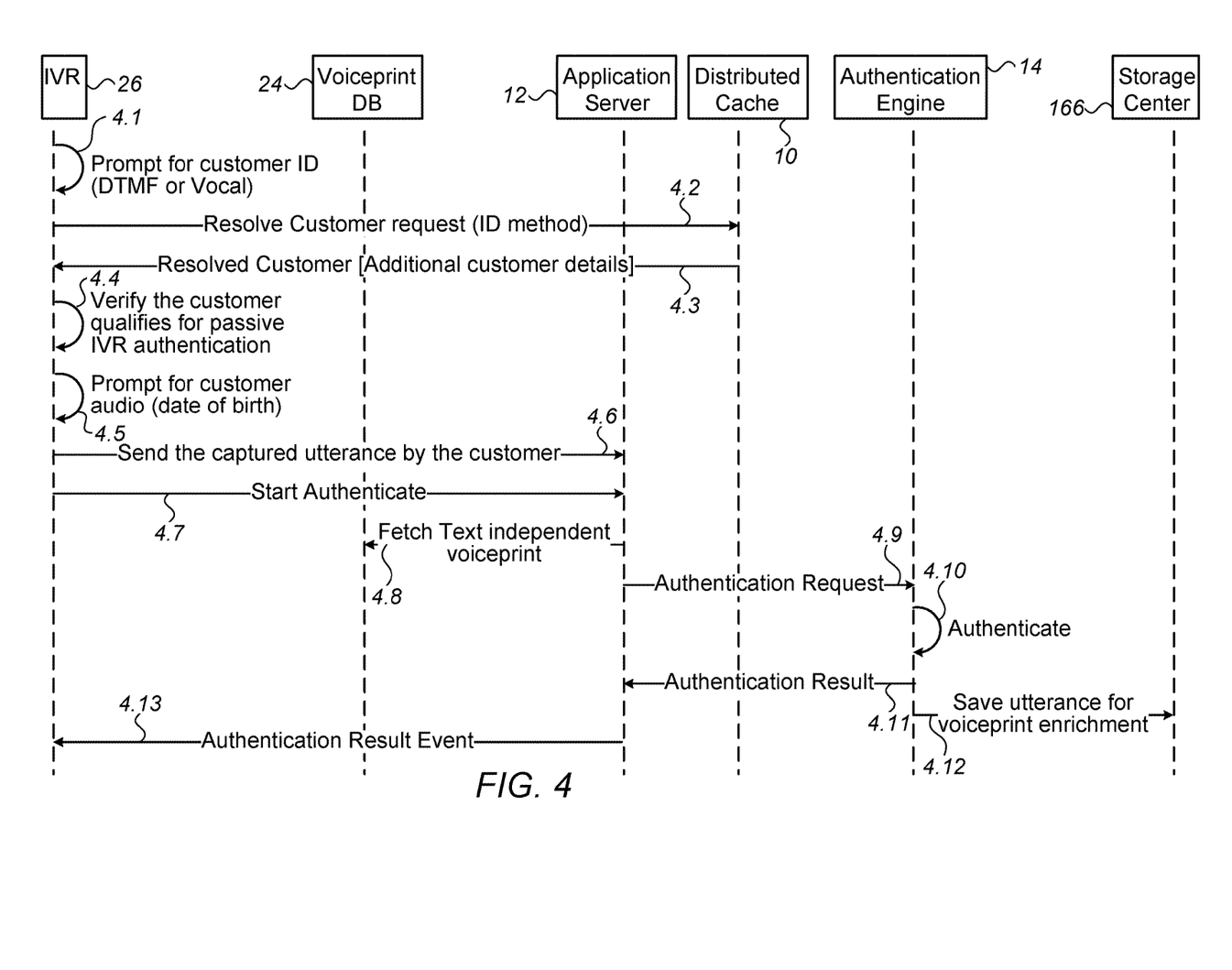
FIG. 4 is a flow chart showing the authentication of an individual according to embodiments of the invention.

A sequence diagram showing a possible authentication message and information flow in a system according to some embodiments of the invention will now be described with reference to FIG. 4. In this example it is assumed that the individual to be authenticated is a customer for services of an IVR system but it will be appreciated that a similar message flow may be used for all kinds of self-service channel. Each arrow in FIG. 4 represents an event or message sequence exchanged between components of the system shown in FIG. 1, as follows:

4.1: The IVR unit 26, as part of an interaction with an individual, prompts the individual, e.g. customer, for some kind of identification. The individual can be asked to speak, or the identification can be provided through use of a keypad, e.g. key presses converted to digital tone multi-frequency "DTMF" tones. In doing this the customer "claims" an identity to be authenticated, to start a self-service transaction. Assuming the individual is already enrolled for authentication by voice biometrics, the identification provided by the customer may be a customer identifier to which a voice print is attached, or with which the voice print is associated. The same is possible for individuals that are not already have been enrolled, since their voice prints may have been stored for possible enrichment and future enrollment.

4.2: A request is sent from the IVR unit 26 to the distributed cache 10 to retrieve the identifier provided by the customer, to which a voice print is attached, or with which a voice print may be associated.

4.3: After retrieving the identifier to resolve or identify the customer, the distributed cache 10 returns the customer identifier to the IVR unit 26 possibly with additional details relating to the customer such as but not limited to last successful authentication date and time.

4.4: A check is made as to whether the customer has qualified for IVR authentication by voice biometrics, for example in a process as described with reference to FIGS. 2 and 3. The flow continues only if the customer does qualify, otherwise another authentication method may be used. Various other authentication methods that do not involve voice biometrics will be known to those skilled in the art.

4.5: The IVR unit prompts the customer to utter a short phrase, which may or may not be predetermined, such as account number, date of birth or any other piece of the customer's knowledge, for example something that the customer can recall spontaneously. Whilst this may be used as an additional source of identification, the main purpose of this is to obtain a sufficiently long segment of speech from the customer for authentication using the voice print. The utterance is captured by the IVR unit in any suitable way, for example by making an audio recording and storing the recording in any suitable form in memory.

4.6: The captured utterance is sent by the IVR unit 26 in the form of a customer voice file or buffer or data stream to the application server 12.

4.7: The authentication process begins—the IVR unit 26 sends a command to the application server 12 to start the authentication process.

4.8: Fetch text independent voiceprint—the application server 12 fetches the customers' text independent voiceprint from the voiceprints database repository, if it was not already retrieved with the customer identifier.

4.9: Authentication request—the application server 12 sends a request to start the authentication to the authentication engine 14. The voice print and the captured utterance may be attached to this request.

4.10: Authentication—the authentication engine 14, with the assistance of the voice biometrics server 22, runs a biometrics algorithm to match the stored customer voiceprint and the captured spoken utterance.

4.11: Authentication result—the result is sent back from the authentication engine 14 to the application server 12.

4.12: Save utterance for voiceprint enrichment—the spoken utterance is stored in the storage center 166 at the application server for further enrichment of the customer's voiceprint. The use of recordings made at the time of authentication to enrich the voice print for future uses has the benefit of continuing to improve the authentication process with each new instance of authentication.

4.13: Authentication result event—the result is passed from the application server 12 to the IVR unit 26. If the customer was successfully authenticated then IVR unit 26 will continue an IVR routine, for example by offering the customer a service menu.

Figure 5:
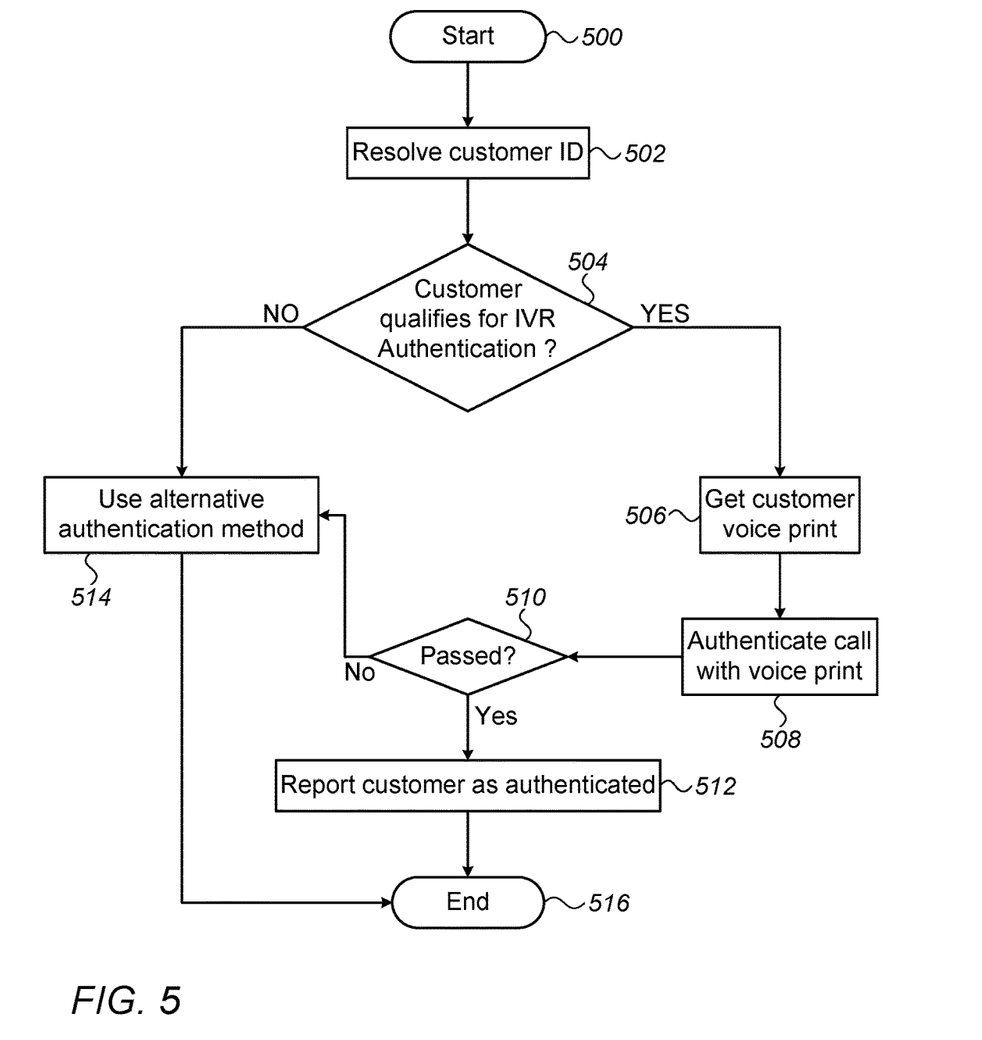
FIG. 5 is a flow chart showing the authentication of an individual according to embodiments of the invention.

A method of authenticating an individual according to some embodiments of the invention will now be described in more detail with reference to FIG. 5. The operations shown in FIG. 5 may be performed by different ones of the components of the system shown in FIG. 2 or, according to some embodiments of the invention they may all be performed by an authentication server, for example operating at applications server 12.

After start up at operation 500 the customer identity is resolved, for example using messaging sequence flows 4.1 and 4.2 described with reference to FIG. 4. Next a determination is made as to whether the customer qualifies for IVR authentication by voice biometrics, for example by being successful in an enrollment process as shown in FIGS. 2 and 3. This check may be done at item 4.4 in the messaging sequence of FIG. 4.

If the customer does qualify for IVR authentication by voice biometrics, then at operation 506 the voice print may be fetched, for example from voice prints database 24. Then an attempt is made to authenticate the customer using the voice print at operation 508. This may take place according to message sequences 4.5-4.10 described with reference to FIG. 4. Then at operation 510 a determination is made as to whether the authentication was successful. If the authentication is successful, for example a sufficiently high similarity score is achieved between captured speech from the calling customer and the stored voice print, the customer is deemed to have passed the authentication at operation 510. An additional operation after operation 510, not shown in FIG. 5, is the saving and use of the utterance captured for authentication to enrich the customer's stored voice print. The authentication process ends at operation 516. The IVR routine may then continue, for example by offering a menu of services to the customer in a flow not described herein.

If the customer does not pass the authentication at operation 510, then according to some embodiments of the invention the customer may be denied the IVR services and the authentication process may end. According to the embodiment shown in FIG. 5, rather than being denied services, the flow continues to operation 514 where an attempt is made to authenticate the customer using any alternative authentication method known in the art. A separate set of authentication operations may take place, not described herein, and the authentication by voice biometrics ends at operation 516.

Embodiments of the invention may provide a method of implicitly, or passively, enrolling individuals using their voice print, for example without asking them to do any active action. The method may be completely text independent and may not require the individual to utter a particular phrase. Any segment of speech by the individual may be used. Similarly the authentication process may be text independent. A segment of speech by the individual may be requested, and this may be a particular phrase. However the request for a particular phrase may be merely for design convenience and the authentication need not depend on the chosen phrase. Thus if the customer does not utter the phrase correctly this need not hinder the authentication by voice biometrics, although it may raise other questions relating to the identity of the customer, for example if they stated an incorrect date of birth. It should also be noted that the request for the customer to utter a particular phrase may be part of an alternative authentication process. Therefore according to some embodiments of the invention the authentication by voice print may not result in any change in the manner in which the customer interacts with the IVR system.

Some embodiments of the invention may take advantage of the improved level of security offered by voice biometrics to offer IVR or self-service services exclusively to those who have successfully enrolled for voice IVR authentication. Thus, for example, those who have successfully enrolled may be able to perform banking transactions and other particularly security-sensitive services using IVR or other self-service channels, whereas others who have not successfully enrolled might have to use other channels for those kinds of services.

A method according to an embodiment of the invention was tested on an example set of audio files from customer calls. The following details the process and interim results:

Audio Input

The audio input used in this evaluation consisted of 529 audio files.

160 of the files were marked for enrollment and 369 for verification.

Calibration

A background model may be created by extracting features of the general population in the customer environment for use in tuning algorithms for maximum performance. This background model may be used in enrolling and authenticating or verifying individuals (speakers). For the purpose of this test, the system was calibrated using an existing background model. When a speaker verification system gets a voice sample for testing, it may compute the probability of match between the voice sample and the voiceprint of the target speaker, and also the probability of match between the voice sample and the background model. The final score of the system is the ratio of these two probabilities, or, as is more often used, the logarithm of this ratio or some other function of it. In order to reach a decision, this final score is compared with a threshold. If the score is higher than the threshold, the claim is accepted; otherwise, it is rejected. (This threshold is different from the thresholds mentioned in connection with FIG. 3 and may be termed a verification threshold.)

Evaluation Execution

Enrollment:

Following the system calibration, voiceprints were trained for the speakers in the audio repository, for example by extracting unique features from their voiceprints. This training may be part of the process of using a voiceprint for enrollment and verification, as is known in the art. In order to train each speaker's voiceprint, the evaluation used a minimum of 1 file and up to 2 files in total.

Authentication Test:

Following the enrollment phase, all audio files marked as authentic were checked against the successfully enrolled voiceprints.

Imposter Test:

Imposter testing was performed by randomly selecting other voiceprint audio files (up to 1 file taken from a single voiceprint).

Results:

Enrollment:

Given the system configuration, the audio repository and the execution plan, of the 152 voiceprints:

126 were successfully enrolled 26 failed enrollment due to various reasons related to the audio used, the average number of files eventually used for enrolling a voiceprint was 1.

Authentic Test:

A total of 322 authentic tests were successfully performed. 15 authentic tests failed due to failed voice print (not trained, for example due to audio quality), the average number of files eventually used for authentic tests per voiceprint is 2.

Imposter Test:

A total of 1256 imposter tests were successfully performed. 260 imposter tests have failed due to the voice print not being trained, the average number of files eventually used for imposter tests per voiceprint is 8.

Reject Analysis:

In order to validate the system performance a manual reject analysis was performed.

1215 files were reviewed in this process.

The following summarizes the outcome:

Number of enrollment files excluded: 31

Number of authentic verification files excluded: 50

Number of imposter verification files excluded: 402

The files were excluded as a result of filtering of the kind described with reference to FIGS. 2, 3 and 8 according to which some individuals are not enrolled.

Figure 6:
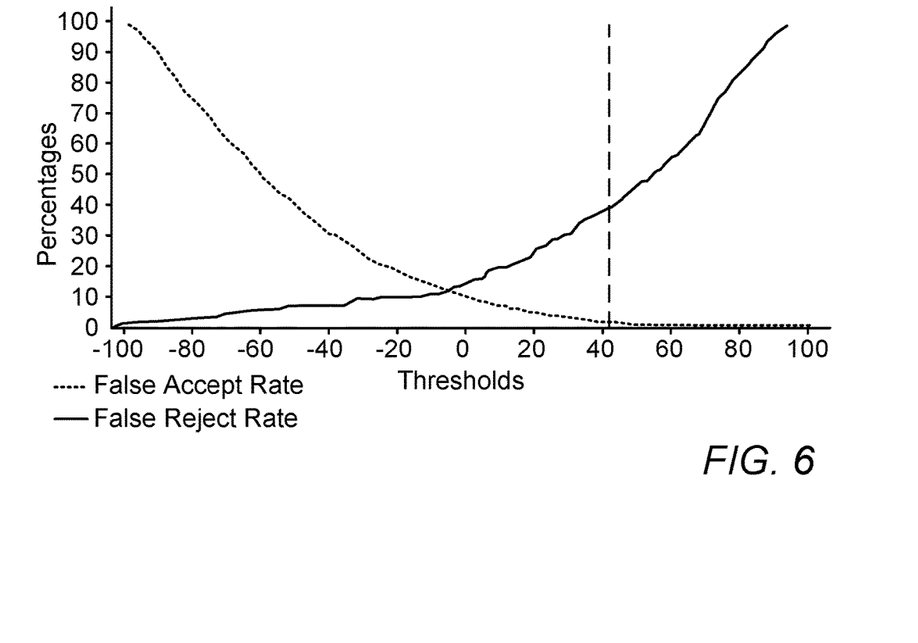
FIG. 6 is a graph of experimental results obtained using passive enrolment according to an embodiment of the invention.
Figure 7:
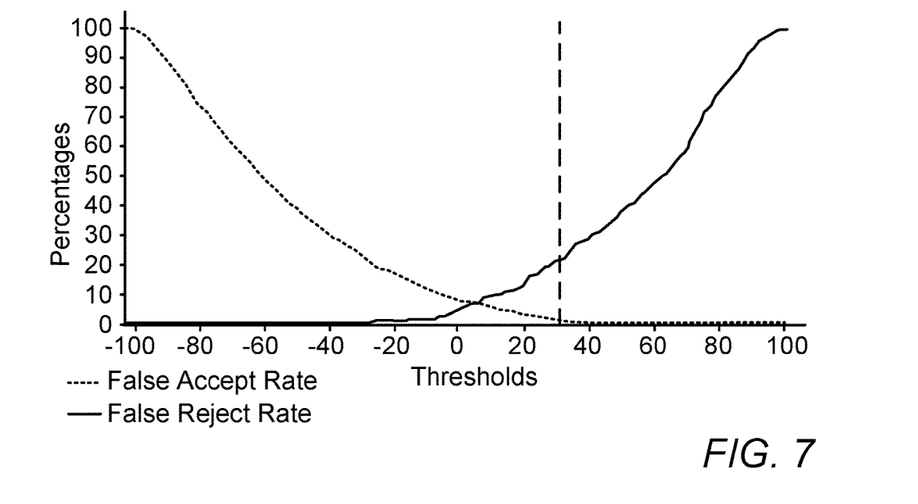
FIG. 7 is a graph of experimental results obtained using passive enrolment with additional suitability testing according to an embodiment of the invention.

Performance Curves:

FIGS. 6 and 7 demonstrate the results of experiments. Each of FIGS. 6 and 7 shows variations in percentage FAR and FRR against verification threshold. In each case, the higher the verification threshold, the higher is the FRR and the lower is the FAR. Thus there may be a tradeoff between FAR and FRR.

An operator of a self-service channel may require a certain maximum FRR. For example, if the FRR is too high customers may be put off using the operator's services. On the other hand industry standards may set a maximum FAR for security purposes. Typical maxima are 1% FAR and 15% FRR for mono voice recordings or 1% FAR and 10% FRR for stereo voice recordings.

FIG. 6 shows the results of authentication using 3-5 second bursts of speech for a typical unfiltered population of individuals. The vertical line is at a FAR of around 1.5% which corresponds to a nearly 40% FRR which may be too high for many operators. It can also be seen in FIG. 6 that the point at which the false accept rate and false reject rate are equal, also known as the equal error rate ERR, is around −5. The ERR is a statistic used to show biometric performance, for example when performing verification or authentication.

FIG. 7 shows the results of authentication using 3-5 second bursts of speech for a population of individuals that has been enrolled in a process of the kind described with reference to FIGS. 2 and 3. This population has been filtered and in this experiment approximately 30% of the population was excluded. The measured EER in this evaluation is 6.99. In FIG. 7, the vertical line shows that a FAR of approximately 1.5% corresponds to a FRR of approximately 22% which is significantly lower.

Figure 8:
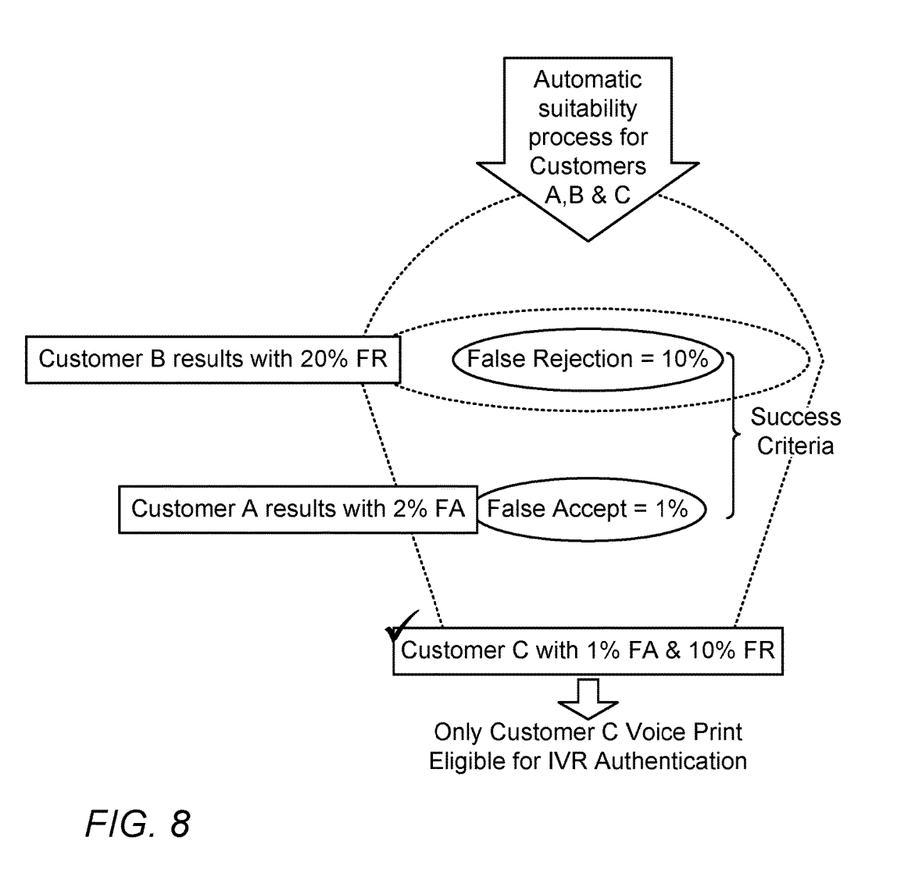
FIG. 8 is a flow chart showing an example of filtering a customer population according to some embodiments of the invention.

FIG. 8 is a flow chart showing a simple example of filtering a customer population according to some embodiments of the invention, in this example the threshold 2 of FIG. 3 operation 317 is 20% and the threshold 1 is 1%. In this example customer B is rejected as having a FRR that is too high and customer A is rejected as having a FA that is too high. These customers are not deemed eligible for voice biometric authentication in self-service channels according to embodiments of the invention. Only one customer C is enrolled in this example.

It will be appreciated from the foregoing that the FAR and FRR are closely related and that one or both of the thresholds used in testing the suitability of a voiceprint may be chosen, for example automatically, to achieve a desired maximum FAR or FRR, which may for example be input to a system according to some embodiments of the invention. The thresholds used in the enrollment process, by which a proportion of the population is filtered, will have an effect on the ERR and the usefulness of voice biometrics in authentication of individuals.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A self-service system enabling individuals to conduct transactions with third parties, the system comprising:
    a memory storing recorded segments of speech by individuals,
    a processor configured to enroll individuals by:
        retrieving one or more of said recorded segments of speech by an individual from said memory and using the retrieved segments to create a text-independent voice print for the individual,
        testing the suitability of the voice print for authenticating the individual in a self-service system using segments of speech of a predetermined maximum duration, and enrolling the individual as suitable for authentication if the voice print passed the suitability test; and
    a processor configured to authenticate individuals using a voice print only if the voice print has passed the suitability test.

2. The system according to claim 1 wherein the processor configured to enroll individuals is further configured to determine a proportion of candidate individuals to be excluded from enrolment based on a predetermined a level of authentication accuracy.

3. A system according to claim 1 wherein the predetermined maximum duration is 5 seconds.

4. A system according to claim 1 wherein the predetermined maximum duration is 3 seconds.

5. A system according to claim 1 wherein the segments of speech used in the suitability tests are different from the previously recorded segments used to create the voice print.

6. A system according to claim 1 wherein said segments of speech of a predetermined maximum duration comprise segments of speech by the individual to be enrolled, and the processor is configured to perform said suitability testing by operations including determining whether those segments enable authentication of the individual.

7. A system according to claim 6 wherein the determination whether those segments enable authentication of the individual is used to derive a false acceptance rate (FAR).

8. A system according to claim 1 wherein said segments of speech of a predetermined maximum duration comprise segments of speech by one or more other individuals than the individual to be enrolled, and the processor is configured to perform said suitability testing by operations including whether those segments enable authentication of any of the other individuals.

9. A system according to claim 8 wherein the determination whether those segments enable authentication of any of the other individuals is used to determine a false rejection rate (FRR).

10. A method of operating a self-service system comprising one or more memories and one or more processors to provide services to customers, the method comprising enrolling a customer to use the system by:
    retrieving one or more recorded segments of speech by the customer from a first memory and
    using a processor:
    creating a voice print for the customer using the retrieved segments,
    testing the suitability of the voice print for authenticating the customer in a self-service system using segments of speech of a predetermined maximum duration, and enrolling the customer as suitable for authentication by voice print if the voice print passed the suitability test;
    the method further comprising, using a processor:
    authenticating the customer using the voice print only if the voice print has passed the suitability test.

11. A method according to claim 10 wherein the authentication comprises prompting the customer using a pre-recorded or automatically generated word or phrase to utter a phrase.

12. A method according to claim 11 wherein the authentication further comprises capturing the utterance or a part of the utterance and comparing the captured utterance to the voice print to authenticate the customer.

13. A method according to claim 9 wherein the predetermined maximum duration is 5 seconds.

14. A method according to claim 10 wherein the predetermined maximum duration is 3 seconds.

15. A method according to claim 10 wherein the segments of speech used in the suitability tests are different from the previously recorded segments used to create the voice print.

16. A method according to claim 10 wherein said segments of speech of a predetermined maximum duration comprise segments of speech by the customer to be enrolled and further comprising performing said suitability testing by operations including determining whether those segments enable authentication of the customer.

17. A method according to claim 16 wherein the determination whether those segments enable authentication of the individual is used to derive a false acceptance rate (FAR).

18. A method according to claim 10 wherein said segments of speech of a predetermined maximum duration comprise segments of speech by one or more other individuals than the customer to be enrolled, and further comprising performing said suitability testing by operations including determining whether those segments enable authentication of any of the other individuals.

19. A method according to claim 18 wherein the determination whether those segments enable authentication of any of the other individuals is used to determine a false rejection rate (FRR).

20. A method of enrolling an individual for authentication by voice biometrics to use a self-service system, the method comprising:

retrieving from a memory one or more recorded segments of speech by the individual and, using one or more processors:

creating a text independent voice print for the individual using the retrieved segments of speech, testing the suitability of the text independent voice print to authenticate the individual, if the voice print passes the suitability test tagging the individual in a memory storing details of individuals as enrolled, and if the voice print fails the suitability test tagging the individual as disqualified from authentication by voice biometrics in said memory storing details of individuals.

* * * * *